May 3, 1960

W. A. LUTZ ET AL 2,935,200

PAN SEAL FOR TRAVELLING PAN FILTER

Filed June 6, 1956

INVENTORS
Enrico Pelitti
William A. Lutz

BY *Theodore M. Jablon*
ATTORNEY

Fig. 3.
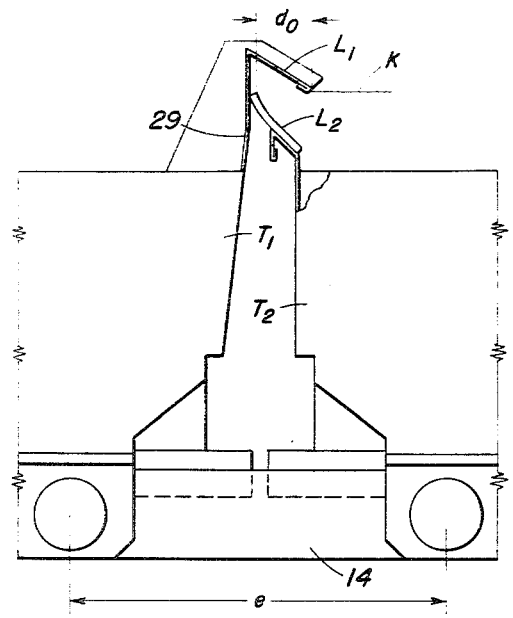
Fig. 4.
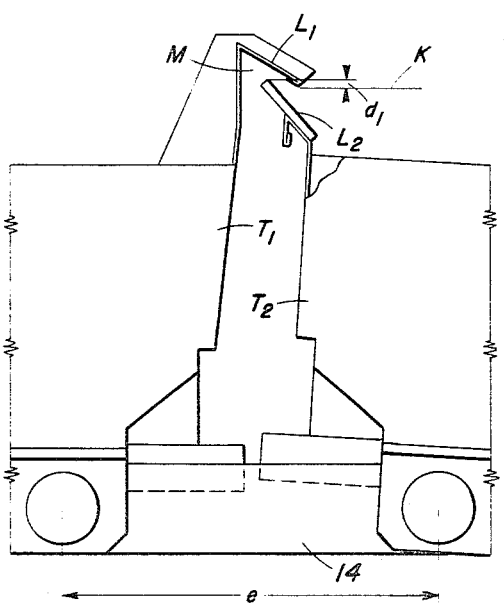
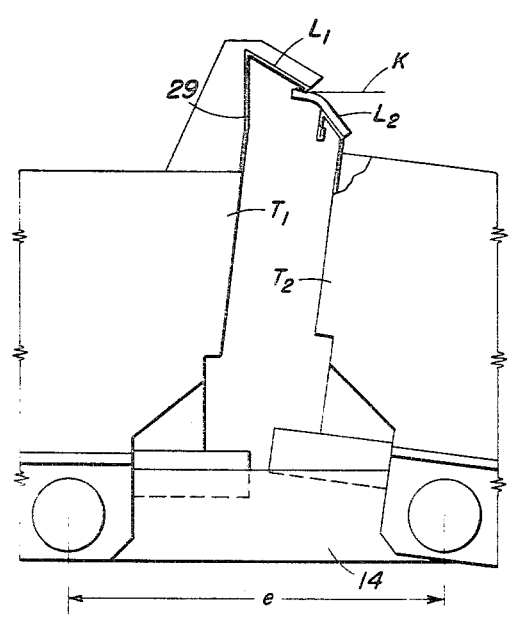
Fig. 5.
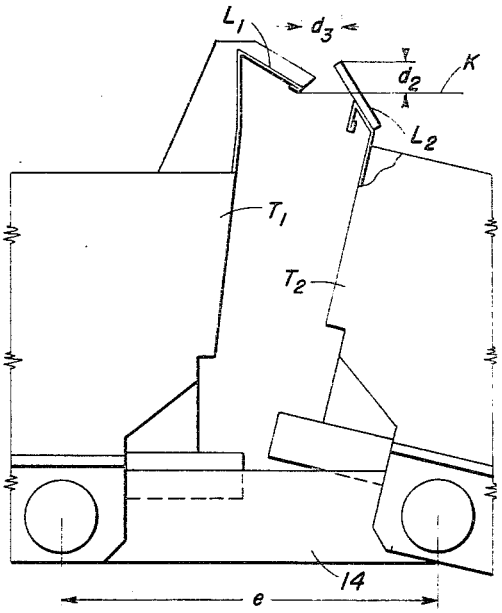
Fig. 6.
INVENTORS
Enrico Pelitti
William A. Lutz

United States Patent Office 2,935,200
Patented May 3, 1960

2,935,200

PAN SEAL FOR TRAVELLING PAN FILTER

William A. Lutz, Westport, and Enrico Pelitti, Stamford, Conn., assignors to Dorr-Oliver Incorporated, Stamford, Conn., a corporation of Delaware Application June 6, 1956, Serial No. 589,777

2 Claims. (Cl. 210—400)

This invention relates to improvements in traveling tray filters in which an endless series of filter trays or filter boxes move in an endless path extending in a vertical plane.

The endless path of travel comprises a horizontal upper portion where the trays having received a charge of the feed slurry travel a horizontal distance through a filtration zone, then through a descending portion of the path where the trays move from an upright position towards an inverted portion for discharging or dumping the filter cake, and then while inverted they move a corresponding horizontal distance in the opposite direction while subjected to washing of the filter media by upwardly directed washing sprays. Finally this endless path of travel comprises an ascending portion where the trays return from the inverted to the upright position and thus to the point of being recharged with feed slurry to be filtered.

An example of such a tray belt filter is found in United States patent or Giorgini No. 2,677,467. In such a filter each tray has a perforated bottom over which a filter medium is stretched, and the effective height of the sides of the trays is such as to meet the particular requirements of the filtration characteristics of the material to be filtered. The filter trays may move on tracks provided upon the framework of the filter unit, and they are linked together in endless fashion, to be moved by driving sprockets engaging lugs provided at the bottom of the trays. In fact, this endless path of travel itself is defined by a large sprocket at each end namely a drive sprocket at one end and a driven sprocket at the other end. When thus driven this set of trays moves in horizontally elongated closed path while the material to be filtered is being supplied to the trays substantially at the point where the ascending succession of the trays passes into the upper horizontal portion of the endless path. While traveling this upper horizontal distance of the path the material in the trays is subjected to vacuum filtration since the bottoms of the trays are in turn connected to an endless rubber suction belt having sliding contact with a longitudinal stationary suction box disposed directly underneath and co-extensive with the upper horizontal portion of the endless path. That is to say, this suction belt has passages or openings through which the bottom openings in the filter trays communicate with the suction box as clearly shown in Figs. 5, 7, 8, 9 and 10 of Patent No. 2,677,467. Moving off the suction box the filter trays pass on to and through the descending portion of the endless path at the far end of the filter unit, dumping the residual material or filter cake into a discharge hopper. The empty filter trays then move on inverted through the horizontal portion of the endless path and thus back to the point of pulp supply for recharging the trays at the near end of the filter unit. Usually, wash water is supplied to the media of the filter trays while traveling in the inverted position by means of a suitable arrangement of spray nozzles disposed underneath the trays for sending upwardly directed sprays of wash water against the filter media of the trays. A catch pan or the like underneath the inverted trays and underneath the spray nozzles is provided for collecting the spent wash water.

The traveling pan filter is particularly suited for the acid filtration operation that is required in the manufacture of phosphoric acid. Phosphoric acid is produced by way of reacting or digesting phosphate rock with sulphuric acid, and the phosphoric acid resulting from the reaction must be filtered from the hot reaction slurry to produce a filter cake of digestion resdue while removing the phosphoric acid itself at a desired relatively high concentration. At such concentration phosphoric acid possesses relatively high viscosity, and the traveling pan filter, because of its elongated extended horizontal operating zone, is particularly suited to handle such acid, through the acid filtration and cake washing phases of the operation, in spite of its high viscosity.

However, an operational problem arises because of high corrosiveness of this hot strong viscous acid where it is being fed from a stationary point of feed to the filter pans moving in endless succession past that point into the effective horizontal filtration zone. While the filter trays themselves may be made of thin gauge stainless steel sheeting immune to acid attack, the problem arises because of acid spray or stray acid particles finding their way through the gaps or spaces between the filter trays, thus reaching unprotected corrodable parts of the filter structure or structural supports, this in spite of the usual overlap of pans provided to bridge the gap.

The general object therefore is to provide effective and positive sealing means for preventing such undesirable and highly annoying diversion of acid spray or stray acid particles to unprotected parts of the environment.

The problem is more precisely set forth as follows:

Since acid feed pulp falls in a continuous stream or in the form of a transverse continuous vertical sheet onto the succession of filter trays that move past the point of feed supply, it is necessary to bar such feed from the spaces or gaps between the filter trays as the feed relatively passes from one tray to the next. Therefore, it has been customary to form the one end wall of each filter tray with an upper extension in the form of a rigid lip or rigid overhang reaching across the gap to and over the end wall of the next following tray to the end of bridging the intervening spaces. But sufficient operating clearance must be provided between the thus associated end portions of the filter trays, as dictated by the kinematics of their movement along the endless path. That is to say, there must nevertheless be adequate clearance between the associated portions or sealing lips to enable them to move freely into and out of gap-bridging relationship during the ascending and during the descending portions of the path of travel. The respective parts or lips while in gap-bridging relationship with one another should protect the gap against the feed, but should be capable of clearing one another as their relative positions change due to the kinematics of their movement along the endless path. In spite of such precaution, in the practical operation, particles of acid spray have found their way continuously out through these clearances to unprotected parts of the filter structure.

While the escape of a relatively small quantity of feed liquid would be harmless and almost unnoticed where non-corrosive liquids are involved, it presents a problem where the feed liquid is of such highly corrosive nature as is the case with the phosphoric acid concentration above referred to.

The general object therefore is that of providing an effective non-corroding seal between the filter trays, and to provide such a seal that is simple, durable and compact, as well as continuously positive in its acid sealing effect.

Compactness of the sealing means in respect of both the horizontal and the vertical dimensions thereof is of special significance for the purposes of this invention. But it is a problem to provide a sealing arrangement which is positively acting against the penetration of even minute quantities of the acid, within the restricted space afforded by the width of the gap between the trays and in view of the fact that the aforementioned necessary operating clearances between the co-acting parts or sealing lips must be accounted for. But the horizontal limitation in turn requires the vertical dimension of the sealing means to be minimized, which again is contrary to the requirement of the operating clearances above referred to.

Vertical compactness of the sealing means is a factor also because the filter pans while inverted in the lower portion of the endless path of travel should move clear of an arrangement of wash spray devices which in turn should be disposed as close upwardly to the filter trays as possible for the benefit of the jets or sprays of wash water directed upwardly against the filter media. The elevation of these wash spray devices in turn governs the height of environmental structure.

While the sealing elements or co-acting lip portions of the sealing arrangement must be free to move into and out of sealing relationship with one another, there is also present the limiting condition that an undue overhang should be avoided of the upper lip with respect to the filter media of the adjoining tray, yet also to be met is the condition that the lower lip should be sufficiently and fully sheltered by the upper lip against impingement of the downcoming stream of feed acid, all this in relation to the other restrictions above set forth. Thus, there is here confronting the operator a complex, compound problem of many inter-acting factors, where practically all the aforesaid conditions, requirements, limitations and restrictions are contrary to one another.

This invention proposes to meet and solve this compound problem by way of providing sealing means which comprise a rigid upper primary sealing lip extending from the end of one tray, which lip is superposed above and overlying a lower secondary lip extending from the end of the adjoining tray. Both lips point towards each other, the upper lip with a downward slant and the lower lip with an upward slant. The upper lip is of rigid construction comprising a highly acid-resisting material such as stainless steel, which upper lip may be fashioned unitary or integral with the associated end of the tray itself. By contrast, the lower lip is of flexible or pliable construction employing a resiliently yieldable sheet material such as synthetic rubber, for example, neoprene, that has a relatively high rating of acid resistance, but is not as lastingly immune as stainless steel to the effects of a hot strong acid such as the phosphoric herein considered. The relative arrangement of the sealing parts or lips here are such as to protect the yieldable lip against the direct effects of the hot strong acid in a manner presently to be set forth.

Further characteristic qualifications of this sealing arrangement lie in the fact that the flexible lip extends from its tray upwardly and across the gap and tangentially deflected into sealing contact with the end wall of the adjoining tray, thus exerting a slight sealing pressure against that wall when the parts have sealing relationship with one another. Furthermore, this flexible lip extends upwardly far enough into the shelter of the downpointing upper rigid lip to prevent acid spray particles from reaching the vulnerable upper edge portion of the flexible lip. That is to say, the upper rigid lip slants downwardly to a safe point relative to the upper edge portion of the flexible lip so as to terminate substantially at least on a level horizontally with that edge as well as a distance horizontally spaced therefrom. Yet, the upper rigid lip also terminates at a point slightly beyond the extreme lower edge of the lower lip to afford a shield against hot acid impact upon the foot end of that lip. But the upper rigid lip at the same time also terminates short of a point where it might present undue overhang over the area of the filter medium of the respective adjoining filter pan. With these qualifications the operation of the sealing means or lips is such that the positive seal is effectively maintained against the penetration of even minute quantities of the acid as long as the lips are in sealing position with respect to one another. However, during the separating phase the flexible uppointing lower lip glides or slips or snaps past the downpointing lip of the upper rigid lip while being deflectingly deformed thereby. Yet, subsequently, the kinematics of the movement are such that respective elements or lips will move past each other with a free clearance between them when they return to sealing position relation to one another.

In one specific embodiment, the foregoing objects are attained by the further qualification that the slant of the upper lip is substantially 30° against the horizontal, whereas the slant of the lower lip is substantially 45° against the horizontal, at the time that the respective parts are in sealing position relative to one another.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds, are therefore intended to be embraced by the claims.

In the drawings:

Figure 1a is a top view of a plurality of filter trays.

Figures 3 to 6 show motion stages in the separating phase of the sealing lips.

Figure 1:
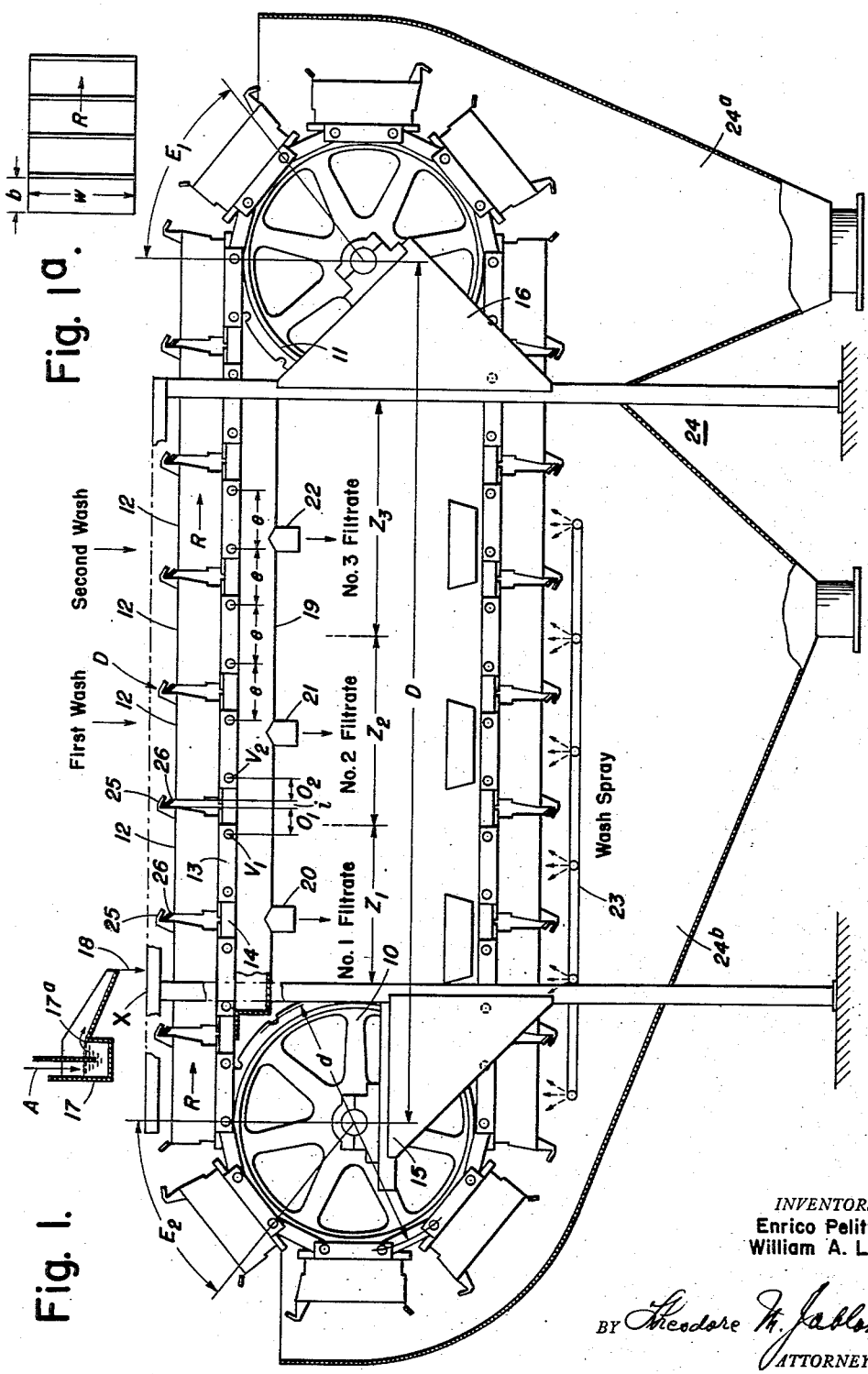
Figure 1 is a semi-diagrammatic view of the traveling pan type filter unit embodying this invention pertaining to the sealing devices effective between respective pairs of filter pans.

The traveling pan filter unit embodying this invention, as shown semi-diagrammatically in Figure 1, comprises a pair of sprockets 10 at the near end, and a pair of sprockets 11 at the far end respectively of the filter unit, the near end being that where feed pulp is supplied to the unit for filtration, while the far end is the one at which the filtration residue or filter cake is discharged. These two sets of sprockets 10 and 11 at the respective ends of the filter unit carry an endless chain of filter trays 12 which with rotation of the sprockets move in an elongated endless path such as defined by the pitch diameter $d$ of the sprockets and by the horizontal distance $D$ between the sprockets 10 and the sprockets 11.

The endless chain of the filter trays 12 comprises a continuity of link members 13 and 14 in alternation. That is to say, the link members 13 carry the filter trays 12 and are identifiable therewith, and they alternate with the connecting link members 14, all having an effective length $e$ corresponding to the pitch of the sprockets 10 and 11. Operating support for the two sets of sprockets 10 and 11 is indicated by way of bearing brackets 15 for sprockets 10 and bearing brackets 16 for sprockets 11. Both sets of sprockets with their bearing brackets are in turn mounted upon a supporting steel structure $x$ diagrammatically shown in Fig. 1. The manner of continuously feeding the pulp to the moving filter trays 12 across the full width thereof is indicated by a transverse feed distribution trough 17 receiving pulp, for instance hot phosphoric acid pulp resulting from the digestion of phosphate rock with sulphuric acid, from a source indicated by arrow A. Such hot acid feed pulp overflows the edge 17A of this trough the length of which responds to the effective width W (see Fig. 1a) of the filter trays. This continuous overflow of feed liquid or pulp from the feed trough 17 onto the filter trays 12 is effectively distributed by means of a curtain 18 consisting of a suitable flexible acid-resisting material depending vertically from the overflow edge of the trough.

It may be noted here that the effective width W of the trays 12 is considerably greater than the effective length $b$ thereof, which ratio of width to length is desirable for reasons of operational efficiency of such a filter unit as a whole. Efficiency of the unit in terms of filter area available, is representable by the sum total of all the component lengths $b$ relative to all the intervening ineffective areas as represented by the distance $i$ between the filter trays.

The endless chain of trays 12 moving through the upper horizontal portion of the endless path, engage upon and travel along the longitudinal suction trough 19 which has vacuum or suction sealing relationship with the trays 12 by way of an endless rubber belt traveling with the chain, this in a well-known manner which need not here be described. Usually, the suction trough 19 also termed the suction box, is compartmented into sections such as shown in Fig. 1 of Patent No. 2,677,467, whereby the first hot phosphoric acid is filtered from the trays into a first section or zone $Z_1$ of the suction trough and is discharged as No. 1 filtrate through a separate outlet 20 from the trough; subsequently within a second zone $Z_2$ of the trough there is applied a first wash to the residual filter cake in the trays, producing a wash filtrate or No. 2 filtrate of relatively dilute phosphoric acid discharging in turn separately through an outlet 21 from the suction trough. Usually this is followed by a second wash of the filter cake in a third filter zone $Z_3$ producing from the filter cake an even more dilute wash filtrate or No. 3 filtrate of phosphoric acid discharging in turn separately through an outlet 22 from the suction trough.

Underneath the lower horizontal portion of the endless path of the filter trays there is provided the usual arrangement 23 of upwardly directed final washing sprays for purging the filter media of the moving trays of residual cake particles. That is to say the trays 12 discharge the previously washed filter cake while descending at the far end of the filter unit, then inverted enter the lower portion of the endless path to be subjected to the wash sprays rising from underneath. The lower portion of the endless chain of the filter trays is surrounded by a hopper structure 24 to receive the discharging filter cake from the descending filter trays in a section 24a and another section or catch pan 24b to receive spent wash water from the wash sprays 23.

Inasmuch as this invention relates to improved means for effectively barring feed liquid such as the acid or acid pulp aforementioned from finding its way into and through the intervening spaces between the trays, there is provided an improved labyrinth type sealing device to be effective between each pair of trays. That device includes a pair of interacting lip portions 25 and 26 extending from respective mutually adjoining end walls of the filter trays in such operative relationship in respect to one another as will presently be described by reference to the enlarged detail of the sealing device shown in Figure 2.

Figure 2:
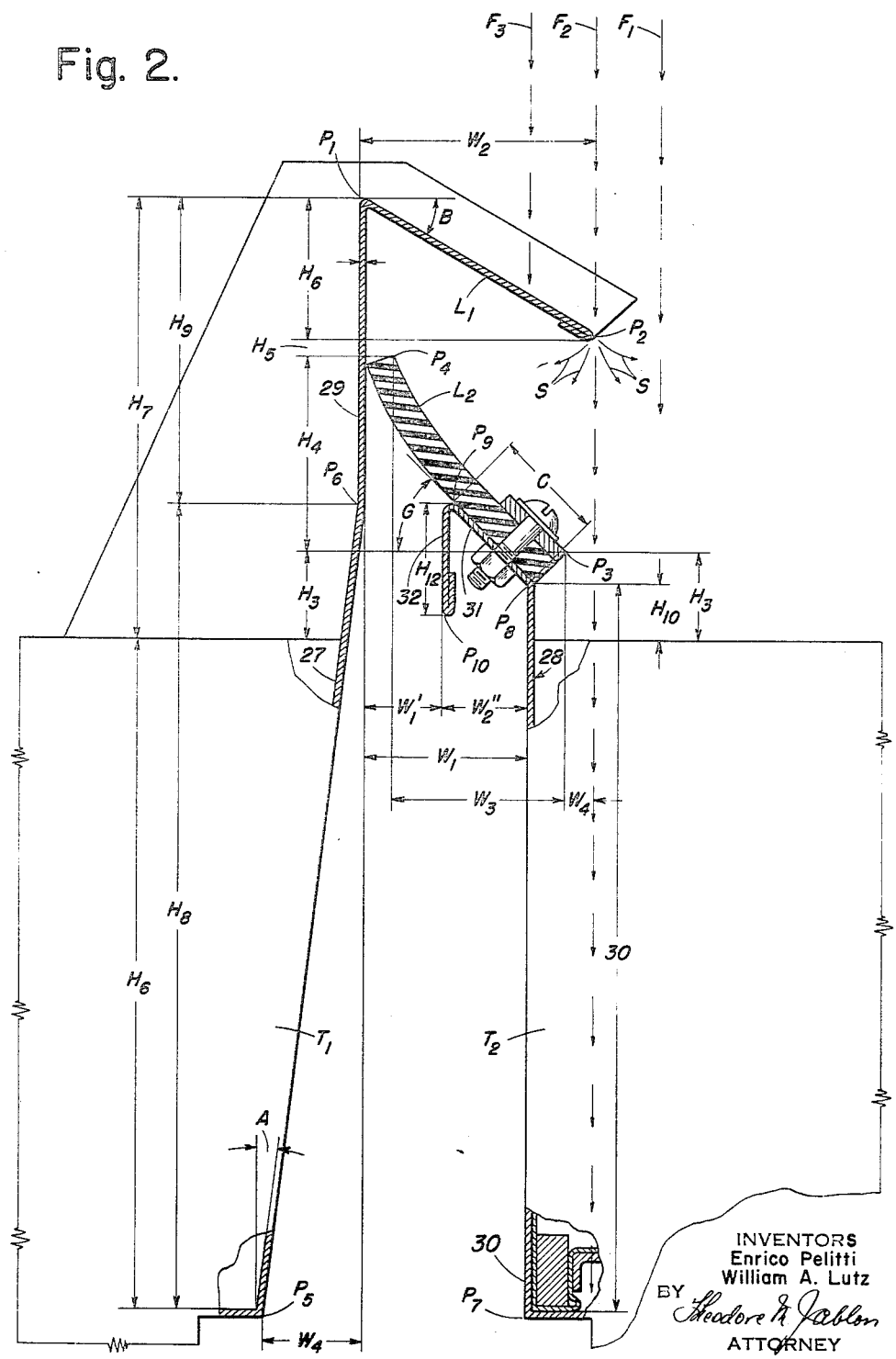
Figure 2 is a greatly enlarged detail view of the sealing device, with one rigid sealing lip and one companion lip flexibly yieldable to said rigid lip.

The enlarged detail Figure 2 represents the respective end portions of a pair of mutually adjoining filter pans $T_1$ and $T_2$ having end walls 27 and 28 respectively spaced from each other an effective distance $W_1$ and sealing lips are designated as $L_1$ and $L_2$ respectively. The extent of the intervening space or gap $W_1$ is more or less governed by the basic length $e$ (see Figure 1) of the link members 13 and 14 of the chain of filter pans. This basic length $e$ in turn is subordinate to or governed by the requirement that the total number of filter pans be minimized to provide a maximum of total effective filter area, but an excessive increase of the basic dimension $e$ will in turn require larger sprocket diameters and thus a longer chain and greater height of the machine as a whole. Therefore, the basic dimension $e$ is also governed by limitations of the sprocket diameter. Still another feature affecting the proper choice of the basic dimension $e$ lies in certain practical limitations regarding the extent of overhangs $O_1$ and $O_2$ (see Figure 1) of a pair of filter pans extending beyond respective pivotal points $V_1$ and $V_2$ thereof. Thus, the spacial relationships between the sealing members or lips $L_1$ and $L_2$ depends upon the basic dimension $e$, upon the gap $W_1$, and further upon the effective height $H_6$ of the filter pans. In view of the foregoing limiting factors, it is a problem to have the total vertical extent of the sealing device D as of maximum compactness compatible with proper sealing efficiency and also compatible with the requirement of the kinematics involved. That is, the sealing device D should extend only a minimum distance $H_7$ above the pan depth $H_6$. Moreover, the sealing device D should combine proper sealing efficiency with compactness in the sense that it must, nevertheless, avoid undue structural overhang beyond the distance of the gap $W_1$, since that would detract from the effectiveness of the available filter area in the respective adjoining filter pan.

Referring to Figure 2, the end wall 27 of filter pan $T_1$ extends from point $P_5$ at the bottom upwardly to point $P_6$, which end wall is here slightly inclined under an angle A against the vertical, the extent of the incline being definable by the vertical projection $W_4$ and the horizontal projection $H_8$. Upwardly from point $P_6$ the end wall $T_1$ has a vertical extension 29 of a length $H_9$ extending from point $P_6$ to $P_1$. Outwardly from the topmost point $P_1$ extends the sealing lip $L_1$ with a downward incline under an angle B of about 30° against the horizontal, the length of lip $L_1$ being defined by the point $P_1$ and by the point or tip $P_2$. The vertical projection of this lip $L_1$ is here designated as $W_2$, while the horizontal projection is designated as $H_5$. The end wall 28 of the other pan $P_2$ is shown to comprise a substantially vertical portion 30 extending from a bottom point $P_7$ upwardly to a point $P_8$ located a short distance $H_{10}$ over and above the effective depth $H_6$ of filter pan $T_2$. At this upper point $P_8$ the end wall 28 is formed with a stiffening bead or beaded portion comprising an upwardly inclined wall portion 31 of the length C directed upwardly under an angle G of about 45° against the horizontal and extending outwardly from the end wall into and about half-way across the intervening space $W_1$ between the pans. The beaded portion of end wall 28 further comprises a vertical terminal portion 32 depending from the topmost point $P_9$ of end wall 29 to a point or tip $P_{10}$, the portion 32 being of a length $H_{12}$ and about bisecting the intervening space $W_1$ between the filter pans into component spaces $W_1'$ and $W_1''$.

Upon the inclined beaded portion 31 is fastened the upwardly directed lip $L_2$ of a resiliently yieldable substantially acid-resistant sheet material, examples of which are synthetic rubber such as neoprene, pure gum rubber, linatex, polyethylene, Teflon, which are also non-porous and non-absorbing with respect to the liquors to be handled by this filter. The length of lip $L_2$ is such as to bridge the space $W_1$ while resiliently and fairly tangentially engaging the end wall 27 of pan $T_1$. This flexible lip $L_2$ extends from a lower end point $P_3$ to an upper end point $P_4$ thereof and it is fully overhung by the upper rigid lip $L_1$. The lower end point $P_3$ is located a distance $H_3$ above the top edge of respective filter pans. It is observed with respect to the relationship between the sealing lips $L_1$ and $L_2$ that lip $L_1$ overhangs the lip $L_2$ past the lower end point $P_3$ as by a horizontal distance $W_4$. It is observed also that the down-pointing end or tip $P_2$ of upper lip $L_1$ lies substantially on a horizontal level with the up pointing tip $P_4$ of the flexible lower lip $L_2$, although there is here shown a slight differential $H_5$ between the elevations of the respective points $P_2$ and $P_4$. The inclination under angle G of the flexible lip $L_2$ is definable as by the vertical projection $W_3$ and the horizontal projection $H_4$ of the length of the lip as measured between the end points $P_3$ and $P_4$ thereof.

A series of characteristic motion stages in the path of travel of the filter pans are shown in Figures 3–10 where Figures 3–6 illustrate sequential phases in the separation of the sealing lips $L_1$ and $L_2$ during that portion of the path of travel that is definable by the angle $E_1$ (see Figure 1), and Figures 7–10 illustrating sequential phases in the re-combining of the sealing lips during that portion of the path of travel which is definable by the angle $E_2$ (see Figure 1).

In the separation of the sealing lips $L_1$ and $L_2$ (see Figures 3–7), Figure 3 shows the starting condition of the lips still in full sealing relationship with respect to each other, and the flexible lip $L_2$ exerting slight sealing pressure due to its tangential deflection upon the end wall portion 29 of the filter pan $T_1$. While in this condition, the respective end points or tips $P_2$ and $P_4$ of the sealing lips appear substantially on a level as defined by the horizontal K although apart from each other a horizontal distance $d_0$.

In Figure 4 the separation of the sealing lips from one another has begun due to a kinematic change in the angular and bodily relationship of the filter pans to one another, with the flexible lip $L_2$ now lodging freely and undeflected within the angular space underneath the upper rigid lip $L_1$. This condition in fact is characterized by a slight vertical overlap $d_1$ between the respective end points of the lips.

In Figure 5 the separation of the lips has progressed further due to a more pronounced change in the angular and bodily relationship between the filter pans. In this condition the flexible lip $L_2$ is engaged by the rigid lip $L_1$ deflecting the flexible lip, but thanks to the ability of the lower lip $L_2$ to yield and being deflected to a moderate degree, the sealing lips $L_1$ and $L_2$ will move past each other without jamming, wear and tear.

In Figure 6 the separation of the sealing lips is at a point of travel where the respective end points or tips of the sealing lips are now apart from each other a vertical distance $d_2$ as well as a horizontal distance $d_3$.

Figure 7:
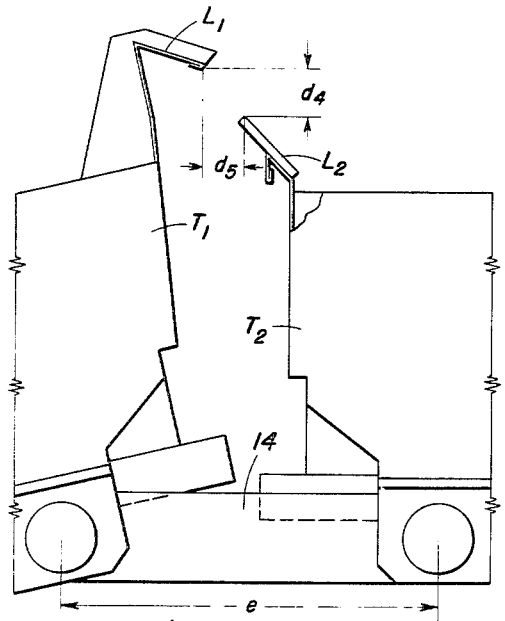
Figures 7 to 10 show motion stages in the re-combining phase of the sealing lips.

In the re-combining of the sealing lips $L_1$ and $L_2$ (see Figures 7–10), Figure 7 indicates the condition where the lips begin to re-approach each other while separated a vertical disance $d_4$ and a horizontal distance $d_5$ from each other.

Figure 8:
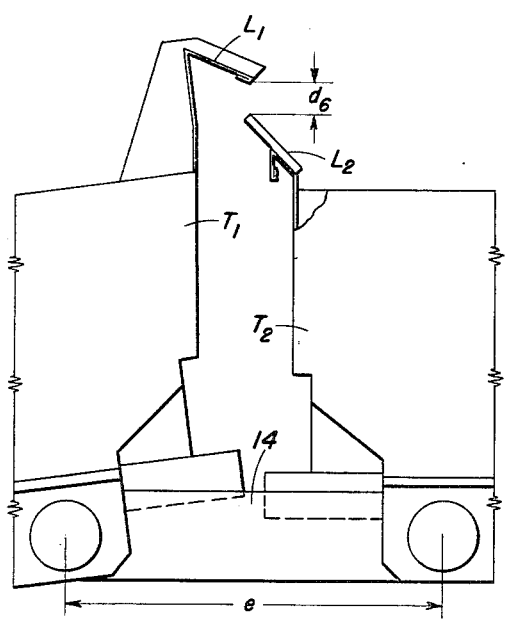

In Figure 8 the lips have advanced towards each other to a point where the horizontal distance between the lips has shrunk to zero whereas vertically they are a distance $d_6$ apart whereby the lips can now move freely past each other towards re-assuming their effective sealing interrelationship.

Figure 9:
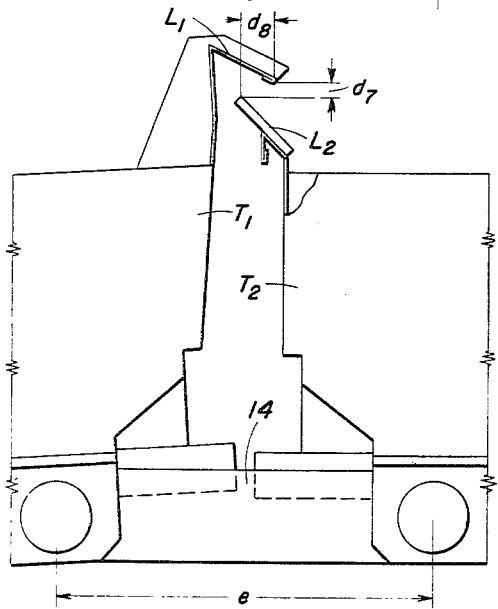

In Figure 9, the vertical distance between the sealing lips has further shrunk to a measure $d_7$, while the lips have attained a horizontal overlap $d_8$.

Figure 10:
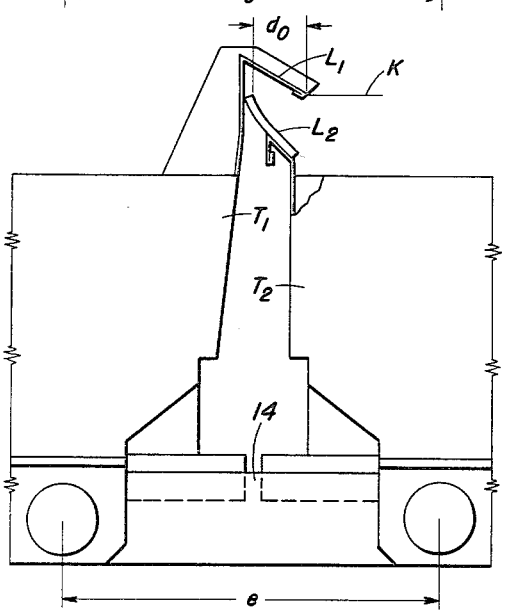

In Figure 10, the sealing lips have become re-combined, with effective sealing relationship reestablished when the end points or tips of the lips are again substantially level on the horizontal K although a horizontal distance $d_0$ apart from each other.

In view of the relationship of parts above defined it develops that:

(a) The secondary splash S of hot strong feed acid straying from point $P_2$ of the upper rigid lip $L_1$ is safely intercepted by the companion flexible lip $L_2$;

(b) The foot end point $P_3$ of the rubber lip $L_2$ is shielded, by the small overhang $W_4$ of lip $L_1$ extending beyond the fastened point $P_3$ of lip $L_2$, against direct impingement by the hot acid feed supply; this overhang $W_4$ is sufficient to prevent secondary splash diversion upwardly of feed liquid hitting top point $P_3$ of the flexible lip, yet insufficient to detract from the effective filter area of the filter pan $T_2$; and (c) Lip $L_2$ will yieldingly clear the rigid lip $L_1$ when separating, yet will pass freely underneath the rigid lip $L_1$ when subsequently re-entering cooperative relationship therewith.

In the operation of the filter unit the sprockets 10 are motor driven to move the endless chain of the filter pans over the idler sprockets 11. When the filter pans pass in the direction of arrow R (see Figure 1) underneath the feed supply trough 17, the sealing devices D are intact with their sealing lips $L_1$ and $L_2$ cooperatively engaged as in the manner shown in Figure 2. That is to say, as a sealing device D progresses towards the feed trough 17 the sheet or stream of feed liquid shown at $F_1$ (see Figure 2) discharges into the filter pan $T_2$ while approaching the point or tip $P_2$ of the upper rigid lip $L_1$. When next the sheet of feed liquid is in its relative position indicated at $L_2$, and begins to impinge directly upon the down-pointing tip $P_2$ of rigid lip $L_1$, then an amount of stray liquid is diverted in trajectories S onto the inclined up-pointing flexible lip $L_2$. As a sheet or stream of feed liquid relatively progresses further up the slope of the top face of rigid lip $L_1$ (as indicated by positions $F_2$ and $F_3$ of the stream), then because of the deflective baffle effect of rigid lip $L_1$ the diversion of stray liquid onto the flexible lip $L_2$ diminishes accordingly as the feed stream approaches the high point $P_1$ of lip $L_1$. The sealing devices D are similarly effective when they subsequently pass from the strong acid filtration zone $Z_1$ through the first cake washing zone $Z_2$, and finally through the second cake washing zone $Z_3$.

In this way, the sealing devices D in full shielding and sealing formation remain intact until the filter pans reach the descending portion of their endless path, that is where the sealing lips $L_1$ and $L_2$ must separate (see Figures 3–7) as the filter pans move through the initial part of their descent definable by the angle $E_1$ of rotational movement of the idler sprockets 11. Having discharged and washed filter cake during this descending phase, the filter pans continue in an inverted position through the lower horizontal portion of their path of travel, while upwardly directed wash sprays 23 act upon the filter media of the pans for cleansing the same. Thereafter the filter pans ascend to their starting feed-receiving position, while the sealing lips $L_1$ and $L_2$ become cooperatively re-engaged during the angular phase $E_2$ preparatory to re-assuming the filtration operating cycle just described.

We claim:

1. A labyrinth type sealing device for adjacent pans of a travelling pan filter employed in handling hot corrosive materials; comprising an upwardly extending lip of yieldable material fixedly secured to the trailing edge of a leading pan, a rigid member of corrosive-resistant material formed at the leading edge of a trailing pan adjacent to the trailing edge of said leading pan and comprising a rigid wall portion extending upwardly from said leading edge of said trailing pan and terminating in a downwardly and forwardly extending shielding portion overhanging said lip on the trailing edge of said leading pan, said lip normally positioned beneath said shielding portion and pressed into sealing relationship with said rigid member to provide a positive seal therebetween while shielding said lip from direct contact with said hot corrosive materials as said materials are fed to said pan.

2. A labyrinth type sealing device for adjacent pans of a travelling pan filter employed in handling hot corrosive materials; comprising an upwardly extending lip of yieldable material fixedly secured to the trailing edge of a leading pan at an angle of 45° with the horizontal, a rigid member of corrosive-resistant material formed at the leading edge of a trailing pan adjacent to the trailing edge of said leading pan and comprising a rigid wall portion extending upwardly from said leading edge of said trailing pan and terminating in a downwardly and forwardly extending shielding portion overhanging said lip on the trailing edge of said leading pan and disposed at an angle of 30° with the horizontal, said lip normally positioned beneath said shielding portion and pressed into sealing relationship with said rigid member to provide a positive seal therebetween while shielding said lip from direct contact with said hot corrosive materials as said materials are fed to said pans.

References Cited in the file of this patent

UNITED STATES PATENTS

| | | |
|---|---|---|
| 647,750 | Hunt | Apr. 17, 1900 |
| 732,499 | Austin | June 30, 1903 |
| 1,026,917 | Kier | May 21, 1912 |
| 1,491,641 | Stephens | Apr. 22, 1924 |
| 1,793,449 | Bassler | Feb. 17, 1931 |
| 2,559,615 | Hapman | July 10, 1951 |
| 2,570,697 | Nordengren | Oct. 9, 1951 |